United States Patent Office 3,450,700
Patented June 17, 1969

3,450,700
2-TERTIARY AMINO-4H-3,1-BENZOXAZIN-4-ONES
Adnan A. R. Sayigh, North Haven, and Henri Ulrich, North Branford, Conn., assignors to The Upjohn Company, Kalamazoo, Mich., a corporation of Delaware
No Drawing. Filed Dec. 20, 1966, Ser. No. 603,146
Int. Cl. C07d 87/16, 87/40; C07c 119/00
U.S. Cl. 260—244     7 Claims

ABSTRACT OF THE DISCLOSURE

Novel 2-dialkylamino- or 2-heteroamino-4H-3,1-benzoxazin-4-ones, which are unsubstituted or substituted in the benzene nucleus. The compounds are useful as antifertility agents and as intermediates in chemical synthesis.

BACKGROUND OF THE INVENTION

Field of the invention

This invention relates to novel benzoxazinones and to processes for their preparation and is more particularly concerned with 2-dialkylamino- or 2-heteroamino-4H-3,1-benzoxazin-4-ones, with derivatives thereof, and with processes for the preparation of these compounds.

Description of the prior art

The preparation of 4H-3,1-benzoxazin-4-ones and the 1,2-dihydro derivatives thereof is well-known in the art. The structure and system of naming of said compounds employed herein is that adopted by Chemical Abstracts as illustrated by the following 2 examples.

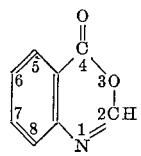    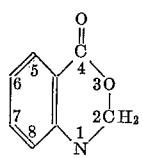

4H-3,1-benzoxazin-4-one     1,2-dihydro-4H-3,1-benzoxazin-4-one 2-amino-4H-3,1-benzoxazin-4-one, and the corresponding compounds in which one hydrogen atom of the amino group has been replaced by alkyl or aryl, have been described previously; see, for example, Sheehan et al., J. Org. Chem. 29, 3599–3601, 1964 and Herlinger, Angew. Chem. 76, 437, 1964. No compounds in which both hydrogen atoms of the 2-amino group in the above compound have been replaced by a substituent such as alkyl have been described hitherto and, indeed, such compounds could not be prepared by the methods described for the preparation of the corresponding monosubstituted amino compounds.

2-disubstituted-amino compounds in the corresponding 1,2-dihydro series are known. For example, German Patent 1,179,217 describes the preparation of 2-dimethylamino-1,2-dihydro-4H-3,1-benzoxazin-4-one by reaction of anthranilic acid with dimethylformamide in the presence of thionyl chloride. However, this method is not applicable to the preparation of the corresponding 2-disubstituted-amino-4H-3,1-benzoxazin-4-ones.

SUMMARY OF THE INVENTION

We have now found that, using a novel process which will be described in detail hereinafter, it is possible to prepare the hitherto undescribed class of 2-disubstituted-amino-4H-3,1-benzoxazin-4-ones.

The novel compounds of the invention can be represented by the formula:

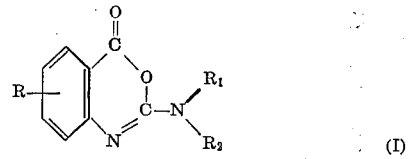

wherein $R_1$ and $R_2$ taken individually represent lower-alkyl and $R_1$ and $R_2$ taken together with the attached N atom represent the residue of a 5 to 7 ring atom heterocyclic amine, and R represents from 0 to 4 substituents selected from the class consisting of lower-alkyl, lower-alkoxy, lower-alkenyloxy, lower-alkylthio, halo, nitro, cyano, thiocyano, and carbo(lower-alkoxy).

The term "lower-alkyl" as used throughout the specification and claims means alkyl from 1 to 8 carbon atoms, inclusive, such as methyl, ethyl, propyl, butyl, pentyl, hexyl, heptyl, octyl, and isomeric forms thereof. The term "lower-alkoxy" as used throughout the specification and claims means alkoxy from 1 to 8 carbon atoms, inclusive, such as methoxy, ethoxy, propoxy, butoxy, pentyloxy, hexyloxy, heptyloxy, octyloxy, and isomeric forms thereof. The term "lower-alkenyloxy" as used throughout the specification and claims means alkenyloxy from 3 to 8 carbon atoms, inclusive, such as allyloxy, butenyloxy, pentenyloxy, hexenyloxy, heptenyloxy, octenyloxy, and isomeric forms thereof. The term "lower-alkylthio" is used throughout the specification and claims means alkylthio from 1 to 8 carbon atoms inclusive such as methylthio, ethylthio, propylthio, butylthio, pentylthio, hexylthio, heptylthio, octylthio, and isomeric forms thereof. The term "halo" as used throughout the specification and claims means fluoro, chloro, bromo, and iodo. The term "carbo(lower-alkoxy)" as used throughout the specification and claims means carbalkoxy wherein the alkoxy moiety is lower-alkoxy as hereinbefore defined. The term "residue of a 5 to 7 ring atom heterocyclic amine" as used through the specification and claims is inclusive of pyrrolidino, alkylpyrrolidino such as 2-methylpyrrolidino, 2,2-dimethylpyrrolidino, and the like, piperazino, alkylpiperazino such as 4-methylpiperazino, 2,4-dimethylpiperazino, and the like, morpholino, piperidino, alkylpiperidino such as 2-methylpiperidino, 3-methylpiperidino, and the like, hexamethyleneimino, homopiperazino, homomorpholino, and the like.

The novel compounds of the invention having the Formula I possess pharmacological activity. Illustratively the compounds of the invention are useful as antifertility agents in mammals, birds, and animals of economic value. For example, the compounds 2-diethylamino- and 2-dibutylamino-4H-3,1-benzoxazin-4-one exhibited oral antifertility activity in rats when tested by the method described by Duncan et al. Proc. Soc. Exp. Biol. Med. 112, 439–442, 1963.

For purposes of administration to mammals, the novel compounds of the invention, either in the form of the free base (I) or in the form of an addition salt thereof with pharmacologically acceptable acid, can be combined with solid or liquid pharmaceutical carriers and formulated in the form of tablets, powder packets, capsules and like solid dosage forms, using starch and like excipients, or dissolved or suspended in suitable solvents or vehicles, for oral or parenteral administration.

The term "pharmacologically acceptable acid" as used herein has the significance normally attributed to it in the pharmaceutical art. Illustrative of such acids are sulfuric, hydrochloric, nitric, phosphoric, lactic, benzoic, methanesulfonic, p-toluenesulfonic, salicyclic acetic, propionic, maleic, malic, tartaric, citric, cyclohexylsulfamic, succinic, nicotinic, ascorbic and the like acids. It will be appreciated that the compounds of Formula I can exist and be used in the form of the free base as illustrated in the said formula or in the form of acid addition salts such as with the pharmacologically acceptable acids exemplified above, or, where the intended use is non-pharmaceutical and the nature of the acid is not critical, with other acids both mono- and polybasic known in the art. This invention is inclusive of the compounds of Formula I in both free base form and in the form of said acid addition salts thereof.

In addition to their pharmacological activity the compounds of the invention are also useful as intermediates in chemical synthesis. For example, the free bases of the Formula I can be reacted with fluosilic acid to form the fluosilicate salts which, in dilute aqueous solution, are effective mothproofing agents as more fully disclosed in U.S. Patents 2,075,359 and 1,915,334.

The compounds of the invention are also useful in that they can be reduced, using hydrogen in the presence of palladium-on-carbon as the catalyst, to the corresponding 1,2-dihydro compounds which, as disclosed in German Patent Specification 1,179,217, are useful as intermediates for dyestuffs.

The compounds having the Formula I are prepared readily and in good yield by condensation of the corresponding o-isocyanatobenzoyl chloride having the formula:

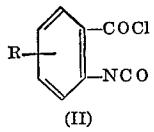

(II)

wherein R has the significance hereinbefore defined, with the appropriate amine $HNR_1R_2$ (III) wherein $R_1$ and $R_2$ have the significance hereinbefore defined. The condensation is carried out conveniently by bringing the reactants together in the presence of an inert organic solvent, i.e. an organic solvent which does not enter into reaction with any of the reactants or in any way interfere with the course of the reaction. Examples of inert organic solvents are ether, pentane, hexane, octane and like aliphatic hydrocarbons, benzene, toluene, xylene, chlorobenzene dichlorobenzene and the like. The reaction is generally exothermic and, if necessary, can be controlled by external cooling or, preferably, by adjusting appropriately the rate of addition or amine (III) to isocyanato acid chloride (II). Advantageously the amount of amine (III) employed is at least two times the stoichiometric proportion i.e. the molar proportion of amine (III) to isocyanato acid chloride (II) is at least 2:1, the second mole of amine being used to neutralise the mole of hydrogen chloride eliminated in the condensation. The reaction is represented by the following equation:

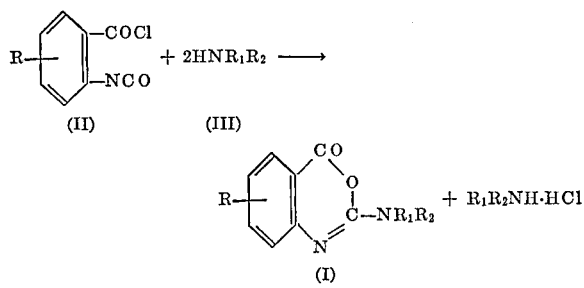

If desired, a higher molar proportion of amine than 2:1 can be employed but offers little advantage and is undesirable economically.

The amine hydrochloride eliminated in the reaction is generally precipitated from solution in substantially quantitative yield and can subsequently be removed by filtration. The desired product (I) can be isolated from the filtrate by conventional procedures, for example, by evaporation of the solvent followed by purification, if necessary, of the product (I), such as by distillation under reduced pressure, chromatography, countercurrent distribution, conversion to a crystalline acid addition salt, and like techniques well-known in the art.

The acid addition salts of the compounds of the invention having the Formula I can be prepared by methods well-known in the art. For example, the acid addition salts of the invention can be prepared by reacting a free base (I) with the appropriate acid in the presence of an inert solvent such as water, ether, lower-alkanols and the like.

The o-isocyanatobenzoyl chlorides (II) which are employed as starting materials in the preparation of the compounds of the invention can be prepared by reaction of thionyl chloride or phosphorus pentachloride on the corresponding isatoic anhydride having the formula:

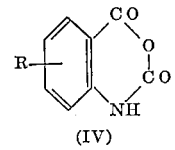

(IV)

wherein R has the significance hereinbefore defined. The reaction is carried out advantageously in accordance with the procedure described by Iwakura et al., J. Org. Chem. 31, 142, 1966.

Alternatively the conversion of the isatoic anhydride (IV) to the corresponding o-isocyanatobenzoyl chloride (II) can be achieved by reaction of the former with phosgene in the presence of a catalytic amount of an N-alkyl-N-(alkyl or aryl)-substituted formamide or alkanolamide, such as N,N-dimethyl formamide, N,N-dimethylacetamide and the like or an N-alkyllactam such as N-methyl-2-pyrrolidone, or an N-alkyl-N-(alkyl or aryl)-N'-arylformamidine or alkanamidine such as N,N-dimethyl-N'-phenylformamidine, N,N-diethyl - N' - phenylformamidine, and the like, or an N,N'-dialkyl-N,N'-di(alkyl or aryl)-N''-arylguanidine such as N,N,N',N'-tetramethyl-N''-phenylguanidine. The procedure employed in said reaction is advantageously that exemplified in Preparation 1 below.

The isatoic anhydrides (IV) above are themselves prepared readily from the corresponding anthranilic acids by reaction with phosgene as described by Iwakura et al., supra. The anthranilic acids employed as starting materials for this purpose are, for the most part, well-known in the art and can be prepared by nitration of the appropriately substituted benzoic acids followed by reduction of the o-nitrobenzoic acids so obtained using procedures well-known in the art for the reduction of aromatic nitro compounds.

As set forth above this invention makes available a class of compounds, namely those of the Formula I above, which could not be prepared by methods hitherto known. The corresponding 1,2-dihydro compounds are already known (German specification 1,179,217) but the method of preparation of said 1,2-dihydro compounds, as discussed above, is not one which could be applied to the preparation of compounds (I). Further, the finding that the compounds (I) could be prepared by reaction of the appropriate secondary amine (III) with the appropriate o-isocyanatobenzoyl chloride (II) is all the more surprising in that Iwakura et al., supra, reported that reaction of N-methylaniline with o-isocyanatobenzoyl chloride gave rise to N-methyl-o-isocyanatobenzanilide with no evidence of formation of a benzoxazinone.

Compounds corresponding to the Formula I in which one of the groups $R_1$ or $R_2$ represents hydrogen have been described by Herlinger, supra, and were obtained by reacting benzo-1,2,3-triazine-4-one with the appropriate hydrocarbyl isocyanate. Such a process could not be employed to prepare the compounds (I) of the invention. Further the compounds described by Herlinger differ from those of the present invention in that Herlinger's compounds can be readily rearranged to the corresponding quinazoline-2,4-diones in the presence of alkali whereas the compounds (I) of the invention are stable under these conditions.

The following preparations and examples illustrate the best mode contemplated by the inventors for carrying out their invention but are not to be construed as limiting the scope thereof.

Preparation 1

To a suspension of 16.3 g. (0.1 mole) of isatoic anhydride in 165 ml. of chlorobenzene was added 0.33 g. (2% by weight based on anhydride) of dimethylformamide. The mixture was stirred and heated gradually to reflux while a continuous stream of phosgene was passed into the reaction mixture at a rate of 1 g./minutes. The passage of phosgene at reflux was continued until a clear solution was obtained. At this time the mixture was purged with nitrogen and the chlorobenzene was removed by distillation. The residue was distilled under reduced pressure to obtain 10.75 g. (59.2% theoretical yield) of 2-isocyanatobenzoyl chloride having a boiling point of 100° to 103° C. at a pressure of 0.3 mm. of mercury. The product solidified to yield material having a melting point of 30° to 33° C.

Preparation 2

A mixture of 79 g. (0.4 mole) of 5-chloroisatoic anhydride and 1.6 g. (2% by weight) of dimethylformamide in 600 ml. of chlorobenzene was stirred and phosgene was passed into the mixture at a rate of 1 g./minute. The mixture was heated to reflux and maintained thereat for 85 minutes while the phosgene stream was continued. At the end of this time a second portion of 1.6 g. (2% by weight based on anhydride) was added and the phosgenation at reflux was continued for a further 35 minutes at which time the solution was clear. The resulting product was cooled and filtered. The filtrate was evaporated to dryness and from the residue 45.5 g. (52.5% theoretical yield) of 2-isocyanato-5-chlorobenzoyl chloride was obtained by trituration with ligroine. The infrared absorption spectrum of this material (chlorobenzene solution) exhibited maxima at $4.4\mu$, $5.62\mu$ and $5.74\mu$.

Using the procedure described above, but replacing 5-chloroisatoic anhydride by the known compounds 6-carbomethoxy-, 4-chloro-, 3-bromo-, 6-fluoro-, 3,5-dibromo-, 3,5-dichloro-, 3,5-diiodo-, 6-ethyl-, 6-propyl-, 3-methyl-, or 6-trfliuoromethylisatoic anhydride, there are obtained 6-carbomethoxy-, 4-chloro-, 3-bromo-, 6-fluoro-, 3,5-dibromo-, 3,5-dichloro-, 3,5-diiodo-, 6-ethyl- 6-propyl-, 3-methyl-, and 6-trifluoromethyl-2-isocyanatobenzoyl chloride, respectively.

EXAMPLE 1

A total of 3.6 g. (0.02 mole) of 2-isocyanatobenzoyl chloride was added, slowly with stirring, to a solution of 2.9 g. (0.04 mole) of diethylamine in 20 ml. of benzene over a period of 5 minutes. The temperature of the reaction mixture rose to a maximum of 70° C. After allowing the mixture to cool to about 25° C. the solid diethylamine hydrochloride which had separated was removed by filtration. The filtrate was evaporated to dryness and the residue was dissolved in 20 ml. of diethyl ether. The resulting solution was filtered and the filtrate evaporated to dryness, the last traces of solvent being removed under reduced pressure. The residue (4.3 g.) was 2-diethylamino-4H-3,1-benzoxazin-4-one in the form of a colorless oil.

*Analysis.*—Calcd. for $C_{12}H_{14}N_2O_2$ (percent): C, 66.03; H, 6.47; N, 12.84. Found (percent): C, 65.73; H, 7.61; N, 13.00.

The infrared absorption spectrum of the above material (carbon tetrachloride solution) exhibited maxima at $5.68\mu$ and $6.0\mu$.

EXAMPLE 2

A total of 5.4 g. (0.03 mole) of 2-isocyanatobenzoyl chloride was added, slowly with stirring, to a solution of 7.7 g. (0.06 mole) of di-n-butylamine in 50 ml. of benzene over a period of five minutes. The temperature of the reaction mixture rose to 65° C. When the mixture had cooled to room temperature (circa 25° C.) the solid di-n-butylamine hydrochloride which had separated was isolated by filtration and the filtrate was evaporated to dryness. The residue was taken up in 50 ml. of diethylether and the resulting solution was filtered. The filtrate was evaporated to dryness, the last traces of solvent being removed under reduced pressure. The residue (7.9 g.) was 2-di-n-butylamino-4H-3,1-benzoxazin-4-one in the form of a greenish oil.

*Analysis.*—Calcd. for $C_{16}H_{22}N_2O_2$ (percent): C, 70.04; H, 8.08; N, 10.21. Found (percent): C, 69.70; H, 8.14; N, 10.25.

The infrared spectrum of the above material (carbon tetrachloride solution) exhibited maxima at $5.68\mu$ and $6.0\mu$.

EXAMPLE 3

A solution of 1.81 g. (0.01 mole) of 2-isocyanatobenzoyl chloride in 12 ml. of benzene was added dropwise with stirring and cooling to a solution of 1.74 g. (0.02 mole) of morpholine in 12 ml. of benzene over a period of 5 minutes. The resulting mixture was stirred for a further hour after addition was complete. At the end of this time the solid morpoholine hydrochloride which had separated was removed by filtration and the filtrate was evaporated to dryness; the last traces of solvent were removed under reduced pressure. There was thus obtained 2.3 g. of 2-morpholino-4H-3,1-benzoxazin-4-one in the form of a viscous oil.

EXAMPLE 4

Using the procedure described in Example 1, but replacing diethylamine by dihexylamine, there is obtained 2-dihexylamino-4H-3,1-benzoxazin-4-one.

Similarly, using the procedure described in Example 1, but replacing diethylamine by dioctylamine, diisopropylamine, N-methylethylamine, pyrrolidine, 2-methylpyrrolidine, piperidine, piperazine, or morpholine there are obtained 2-dioctylamino-, 2-diisopropylamino, 2-N-methyl-N-ethylamino-, 2-pyrrolidino-, 2-(2-methylpyrrolidino)-, 2-piperidino-, 2-piperazino, and 2-morpholino-4H-3,1-benzoxazin-4-one, respectively.

EXAMPLE 5

Using the procedure described in Example 1, but replacing 2-isocyanatobenzoyl chloride by 2-isocyanato-5-chlorobenzoyl chloride, there is obtained 2-diethylamino-5-chloro-4H-1,3-benzoxazin-4-one.

Similarly, using the procedure described in Example 1, but replacing 2-isocyanatobenzoyl chloride by 6-carbomethoxy-, 4-chloro-3-, 3-bromo-, 6-fluoro-, 3,5-dibromo-, 3,5-dichloro-, 3,5-diiodo-, 6-ethyl-, 6-propyl-, 3-methyl-, or 6-trifluoromethyl-2-isocyanato-benzoyl chlorides, there are obtained 2-diethylamino-6-carbomethoxy-, 2-diethylamino-4-chloro-, 2-diethylamino-3-bromo-, 2-diethylamino-6-fluoro-, 2-diethylamino-3,5-dibromo-, 2-diethylamino-3,5-dichloro-, 2-diethylamino-3,5-diiodo-, 2-diethylamino-6-ethyl-, 2-diethylamino-6-propyl-, 2-diethylamino-3-methyl-, and 2-diethylamino-6-trifluoromethyl-4H-3,1-benzoxazin-4-one, respectively.

EXAMPLE 6

A solution of 1 g. of 2-diethylamino-4H-3,1-benzoxazin-4-one in 20 ml. of diethyl ether is treated dropwise, with stirring, with an excess of a saturated ethereal hydrogen chloride solution. The solid which separates is isolated by filtration, washed with ether and dried. There is thus obtained 2-diethylamino-4H-3,1-benzoxazin-4-one hydrochloride.

We claim:
1. A compound having the formula:

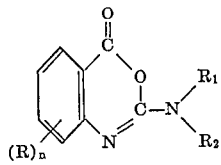

wherein $R_1$ and $R_2$ taken individually represent lower-alkyl and $R_1$ and $R_2$ taken together with the attached N atom represent the residue of a 5 to 7 ring atom heterocyclic amine selected from the class consisting of pyrrolidino, 2 - methylpyrrolidino, 2,2 - dimethylpyrrolidino, piperazino, 4 - methylpiperazino, 2,4 - dimethylpiperazino, morpholino, piperidino, 2-methylpiperidino, 3-methylpiperidino, hexamethyleneimino, homopiperazino, and homomorpholino, R is selected from the class consisting of lower-alkyl, lower-alkenyloxy, halo and carbo(lower-alkoxy) and $n$ is an integer from 0 to 2.

2. A compound having the formula:

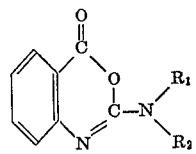

wherein the group

is a member selected from the class consisting of diethylamino, dibutylamino and morpholino.

3. A compound having the formula:

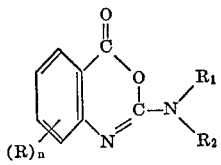

wherein the group

is a member selected from the class consisting of pyrrolidino, 2-methylpyrrolidino, 2,2-dimethylpyrrolidino, piperazino, 4-methylpiperazino, 2,4-dimethylpiperazino, morpholino, piperidino, 2-methylpiperidino, 3-methylpiperidino, hexamethyleneimino, homopiperazino, and homomorpholino, R is selected from the class consisting of lower-alkyl, lower-alkenyloxy, halo and carbo(lower-alkoxy) and $n$ is an integer from 0 to 2.

4. A process for the preparation of a compound having the following formula:

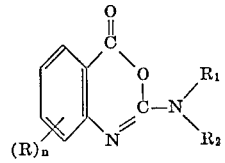

wherein $R_1$ and $R_2$ taken individually represent lower-alkyl and $R_1$ and $R_2$ taken together with the attached N atom represent the residue of a 5 to 7 ring atom heterocyclic amine selected from the class consisting of pyrrolidino, 2-methylpyrrolidino, 2,2-dimethylpyrrolidino, piperazino, 4-methylpiperazino, 2,4-dimethylpiperazino, morpholino, piperidino, 2-methylpiperidino, 3-methylpiperidino, hexamethyleneimino, homopiperazino, and homomorpholino, R is selected from the class consisting of lower-alkyl, lower-alkenyloxy, halo and carbo(lower-alkoxy) and $n$ is an integer from 0 to 2, which process comprises reacting the appropriate o-isocyanatobenzoyl chloride having the formula:

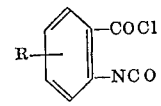

wherein R is as defined hereinabove with the appropriate amine $HNR_1R_2$ wherein $R_1$ and $R_2$ are as defined hereinabove, in the presence of an inert solvent, said amine being employed in the proportion of at least 2 moles of amine to 1 mole of isocyanatobenzoyl chloride.

5. The process of claim 4 wherein the amine is diethylamine.

6. The process of claim 4 wherein the amine is dibutylamine.

7. The process of claim 4 wherein the amine is morpholine.

References Cited

Farbwerke Hoechst A.G. Chem. Abst. vol. 62, column 569 (1–4–65) (Abst. of German Patent 1,179,217).
Herlinger Angew. Chem., vol. 76, page 437 (1964).
Lempert et al. Monatsh., vol. 95, pages 950–60 (1964).
Sheehan et al., Jour. Org. Chem., vol. 29, pages 3599–3601 (1964).

HENRY R. JILES, Primary Examiner.

N. TROUSOF, Assistant Examiner.

U.S. Cl. X.R.

260—247.2, 453, 454, 465, 471, 999